US012305824B2

(12) United States Patent
Risthaus

(10) Patent No.: US 12,305,824 B2
(45) Date of Patent: May 20, 2025

(54) HEADLIGHT FOR VEHICLES

(71) Applicant: HELLA GmbH & Co. KGaA, Lippstadt (DE)

(72) Inventor: Piet Risthaus, Dortmund (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/519,815

(22) Filed: Nov. 27, 2023

(65) Prior Publication Data

US 2024/0093851 A1 Mar. 21, 2024

Related U.S. Application Data

(63) Continuation of application No. PCT/EP2022/061758, filed on May 3, 2022.

(30) Foreign Application Priority Data

May 27, 2021 (DE) ..................... 10 2021 113 704.7

(51) Int. Cl.
*F21S 41/20* (2018.01)
*F21S 41/143* (2018.01)
*F21Y 115/10* (2016.01)

(52) U.S. Cl.
CPC ........... *F21S 41/285* (2018.01); *F21S 41/143* (2018.01); *F21Y 2115/10* (2016.08)

(58) Field of Classification Search
CPC .... F21S 41/285; F21S 41/143; F21S 41/2805; F21S 41/28; F21S 41/25; F21S 41/26;
(Continued)

(56) References Cited

U.S. PATENT DOCUMENTS 4,930,051 A * 5/1990 Golz ....................... F21S 41/28 362/336
9,476,558 B2 10/2016 Stefanov et al.
(Continued)

FOREIGN PATENT DOCUMENTS

DE 3019545 A1 11/1981
DE 3036987 A1 5/1982
(Continued)

OTHER PUBLICATIONS

International Search Report dated Sep. 2, 2022 in corresponding application PCT/EP2022/061758.

*Primary Examiner* — Erin Kryukova
(74) *Attorney, Agent, or Firm* — Muncy, Geissler, Olds & Lowe, P.C.

(57) ABSTRACT

A headlight for a vehicle with a light source and a lens arrangement associated with it, containing a light entry surface on a side facing the light source and a light emission surface on a side facing away from the light source, wherein light emitted by the light source is mapped by means of the lens arrangement to a predetermined light distribution. A scattering optic part is assigned to the lens arrangement for scattering the light emitted by the lens arrangement. The surface structuring of the scattering optic part has a plurality of cone-shaped optical elements arranged in a row, which are arranged alternately curved in the row direction, wherein a second cone-shaped optical element adjacent to a first cone-shaped optical element is formed by twisting the first cone-shaped optical element on two perpendicular axes.

13 Claims, 3 Drawing Sheets

(58) Field of Classification Search
CPC ... F21S 41/265; F21S 41/275; F21Y 2115/10; F21W 2102/155; G02B 6/0036; G02B 6/0038
See application file for complete search history.

(56) References Cited

U.S. PATENT DOCUMENTS

| | | | |
|---|---|---|---|
| 10,260,698 | B2 | 4/2019 | Björn et al. |
| 11,002,421 | B2 | 5/2021 | Brueggemann et al. |
| 11,845,378 | B2 | 12/2023 | Risthaus |

FOREIGN PATENT DOCUMENTS

| | | | | | |
|---|---|---|---|---|---|
| DE | 3036987 | C2 | * | 2/1994 | .......... F21S 48/1233 |
| DE | 3048849 | C2 | * | 4/1995 | .......... F21S 48/1233 |
| DE | 102013217843 | A1 | | 3/2015 | |
| DE | 102014118745 | A1 | | 6/2016 | |
| DE | 102017117376 | A1 | | 2/2019 | |
| DE | 102018131556 | A1 | | 6/2020 | |
| DE | 102019104854 | A1 | | 8/2020 | |
| FR | 2483046 | A1 | * | 11/1981 | |
| WO | WO-2019224185 | A1 | * | 11/2019 | ............ F21S 41/143 |
| WO | WO-2021043544 | A1 | * | 3/2021 | ............ F21S 41/143 |

* cited by examiner

HEADLIGHT FOR VEHICLES

This nonprovisional application is a continuation of International Application No. PCT/EP2022/061758, which was filed on May 3, 2022, and which claims priority to German Patent Application No. 10 2021 113 704.7, which was filed in Germany on May 27, 2021, and which are both herein incorporated by reference.

BACKGROUND OF THE INVENTION

Field of the Invention

The invention relates to a headlight for a vehicle with a light source and a lens arrangement associated with it, containing a light entry surface on a side facing the light source and a light emission surface on a side facing away from the light source, wherein light emitted by the light source is mapped via the lens arrangement to a predetermined light distribution.

Description of the Background Art

From DE 10 2017 117 376 A1, which corresponds to US 2020/0173621, which is incorporated herein by reference, a headlight for vehicles is known that comprises a light source and a lens arrangement assigned to it, which has a light entry surface and a light emission surface. The light emission surface of the lens arrangement is cylindrical in shape.

From DE 10 2018 131 556 A1, which corresponds to US 2021/0300233, which is incorporated herein by reference, a headlight for vehicles known with a light source and with a lens arrangement assigned to it. The lens arrangement has a light emission surface that has a surface structuring.

From DE 10 2019 104 854 A1, which is incorporated herein by reference, a headlight for vehicles with a light source and a lens arrangement assigned to it is known, wherein the lens arrangement has an aspherical lens. Such aspherical lenses are suitable for redirecting the light emitted by the light source to form a predetermined light distribution. For design reasons of the headlight, it may be desirable that a scattering optic part with a surface structure is arranged in front of the lens in the light emission direction.

However, a problem in the conventional art is that there is an undesirable distortion of light distribution.

SUMMARY OF THE INVENTION

It is therefore an object of the present invention to further develop a headlight for vehicles with a light source and a lens arrangement in such a way that no distortion of the light distribution occurs when a scattering optic part with a surface structuring is provided on a side arranged in front of the lens arrangement.

In order to achieve this object, the invention provides, in an example, that a scattering optic part for scattering the light emitted by the lens arrangement is assigned to the lens arrangement, that the surface structuring of the scattering optic part comprises a plurality of cone-shaped optical elements arranged in a row, which are curved and arranged alternately in a row, wherein a second cone-shaped optical element adjacent to a first cone-shaped optical element is formed by twisting the first cone-shaped optical element on two perpendicular axes.

An advantage of the invention is that by arranging cone-shaped optical elements alternately arranged in rows, a light deflected by the lens arrangement is scattered in such a way that a distortion-free and legally permissible light distribution is produced. It is advantageous not to have an arc-shaped flattening of a light/dark boundary of the light distribution (low beam distribution), as would be the case with the formation of cylindrical optical elements. The alternating curvature in the row direction—the optical elements are arranged alternately convex and concave in the row direction—in conjunction with the mirrored arrangement of the adjacent cone-shaped optical elements, ensures that the light distribution or a light/dark boundary of the light distribution runs in a straight line.

The cone-shaped optical elements can be arranged in a fan-like manner, diverging from a narrow end to a wide end with opposite side margins, wherein opposite side margins of the cone-shaped optical elements are connected to each other by an arc, the radius of which increases from the narrow end of the cone-shaped optical element towards the broad end of the latter. The shape of the cone-shaped optical elements is due to the cone shape of the opposite side margins.

The arc running between the side margins can be circular, resulting in a conical cylindrical wave structure in the row direction of the cone-shaped optical elements. Advantageously, the surface structuring consequently has a relatively simple structure.

Preferably, the side margins of the cone-shaped optical elements of a row or several rows can extend in a common plane, which reduces the manufacturing effort.

The rows of the cone-shaped optical elements can be arranged next to each other and not offset to the row direction. The surface structuring thus has a regular structure, which leads to the desired homogeneous scattering of the light emitted by the lens arrangement.

The scattering optic element can be arranged at an angle to an optical axis of the lens arrangement. The alternating conical surface structuring of the scattering optics can advantageously compensate for the light scattering to form a predetermined light distribution.

The lens arrangement can be formed only by a lens with an aspherically formed light emission surface. Preferably, a light entry surface of the lens can be curved outwards, so that no other optical components are required to generate the desired light distribution.

The light source can be designed as an LED light source, wherein a lens is associated with each LED light source. As a result, the headlight can be designed to be relatively space-saving.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
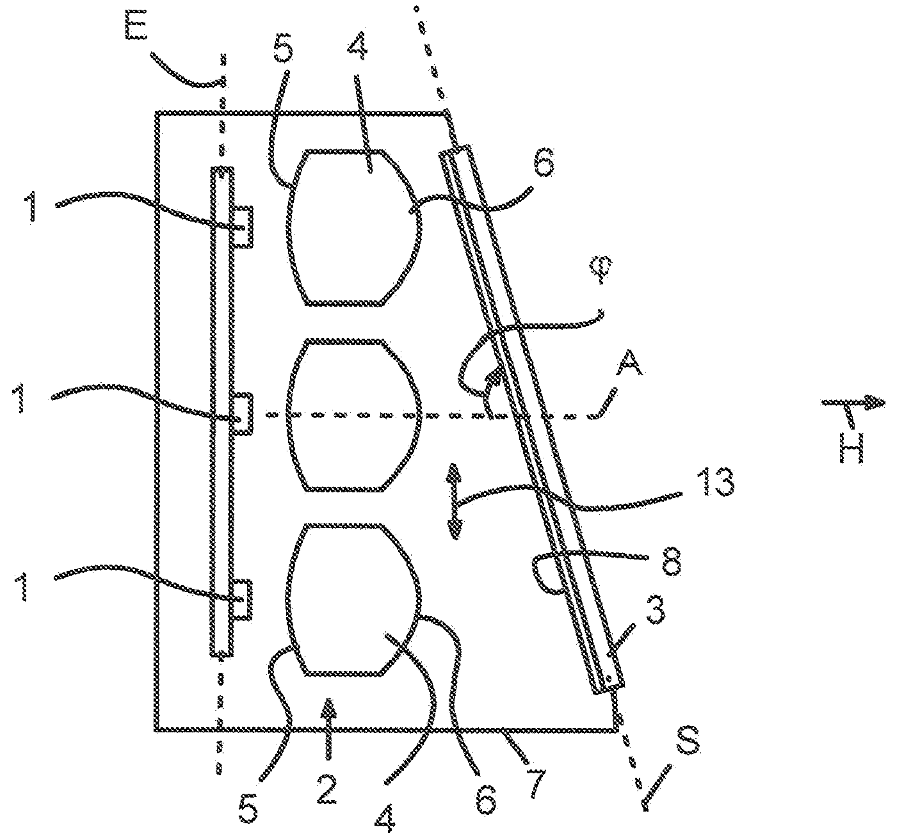
FIG. 1 shows a schematic side view of a headlight according to the invention with a scattering optic part arranged at the front.

A headlight for vehicles is located in a front area of the same. In the present example, the headlight has several light sources 1, which are arranged in a light source plane E. In the main emission direction H in front of the light sources 1, a lens arrangement 2 and a scattering optic part 3 are arranged.

The lens arrangement 2 is formed of a plurality of lenses 4, each of which is assigned a single light source 1. The lenses 4 are each designed the same. They each have an outwardly curved light entry surface 5, which is arranged on a side facing the light source 1. In addition, the lenses 4 each have an aspherically premolded light emission surface 6, which is arranged on a side facing away from the light source 1.

The scattering optic part 3 is flat or arranged in an extension plane S inclined to the optical axis A of the lenses 4. The extension plane S includes an acute angle φ with the optical axes A.

If the scattering optic part 3 also forms a lens of the headlight; it is firmly connected to a housing 7 of the headlight on the edge side.

On a flat side facing the lens arrangement 2, the scattering optic part 3 has a surface structuring 8, which is formed of a plurality of cone-shaped optical elements 9 arranged in a row R. The rows R of cone-shaped optical elements 9 are of the same design and run in a straight line in the same direction. In the present embodiment, the row direction 15 runs in a horizontal direction or perpendicular to the optical axis A of the lens arrangement 2 or lens 4.

The cone-shaped optical elements 9 of a respective row R of cone-shaped optical elements 9 are alternately curved in the direction 15 of the row R of cone-shaped optical elements 9. A first cone-shaped optical element 9' of the row R of cone-shaped optical elements 9 is designed to be curved outwards with respect to the extension plane S, while an adjacent second cone-shaped optical element 9'' of the same row R is designed to be curved inwards with respect to the extension plane S. In addition, the second cone-shaped optical element 9'' is mirrored to the first cone-shaped optical element 9'. The second cone-shaped optical element 9'' is obtained by twisting the first cone-shaped optical element 9' on two perpendicular axes D1, D2. One axis of rotation D1 is a longitudinal central axis of the cone-shaped optical elements 9. The second axis of rotation D2 runs in a transverse center plane of the cone-shaped optical elements 9. This double twisting of the cone-shaped optical element 9 refers to points in an equal plane of the cone-shaped optical element 9. This double twisting thus refers to the side margins 12 of the optical elements 9 that diverge from a narrow end 10 of the respective cone-shaped optical elements 9 to a wide end 11 of the same, which are located in a common plane. The intervening curved surface is mapped from the first cone-shaped optical element 9' to the second cone-shaped optical element 9'' by a point reflection at a fixed point, wherein after said point reflection, the side margins 12 of the adjacent cone-shaped optical elements 9', 9'' pointing towards each other are “united” at the fixed point, i.e., the adjacent cone-shaped optical elements 9', 9'' are not spaced from each other, but are immediately adjacent to each other, as shown in FIGS. 2 and 3.

The second cone-shaped optical element 9'', which is adjacent to the first cone-shaped optical element 9', is thus formed by twisting the first cone-shaped optical element 9' by 180° about the first axis of rotation D1 and then twisting it about the second axis of rotation D2. The first axis of rotation D1 runs in the longitudinal direction of the cone-shaped optical elements 9 or in the direction of the extension plane S of the scattering optic part 3. The second axis of rotation D2 is perpendicular to the extension plane S of the scattering optic part 3.

Figure 2:
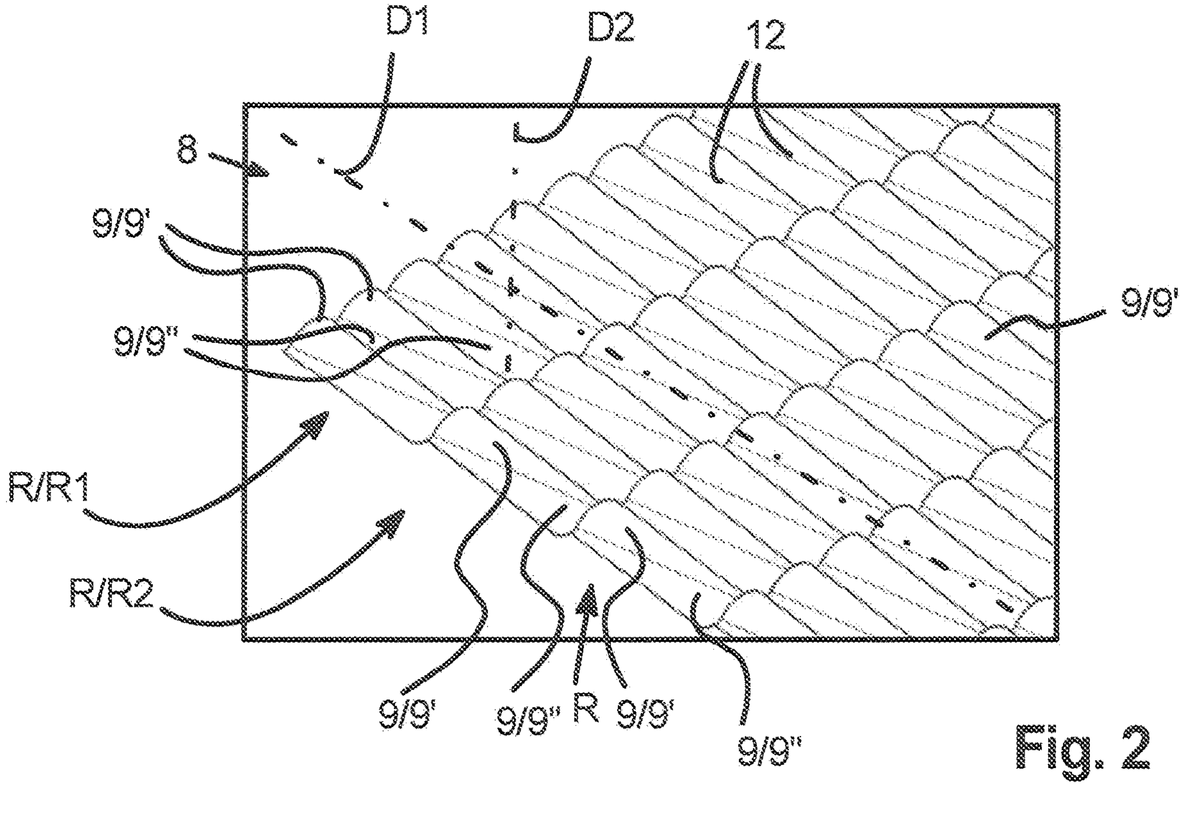
FIG. 2 shows a section of the scattering optic part with a multi-row arrangement of cone-shaped optical elements.
Figure 3:
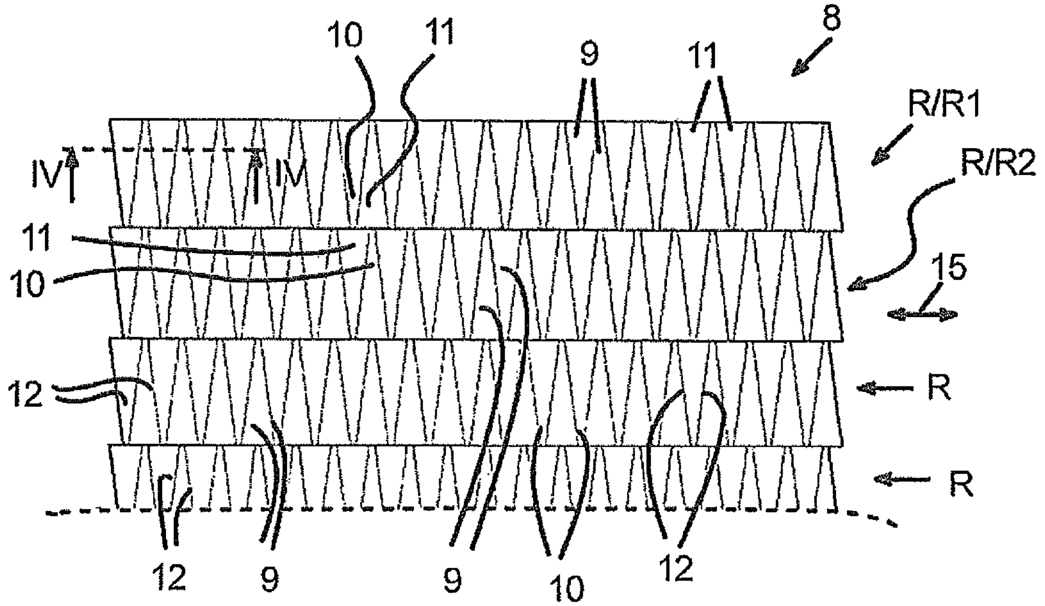
FIG. 3 shows a front view of the surface structuring of the scattering optic part.
Figure 4:
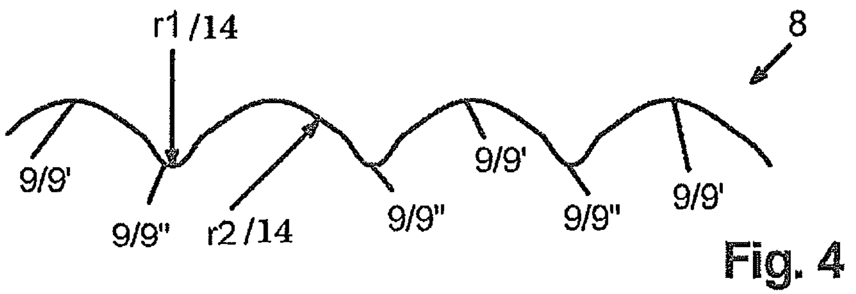
FIG. 4 shows a cross-section through a plurality of cone-shaped optical elements along the intersection line IV-IV in FIG. 3.
Figure 5:
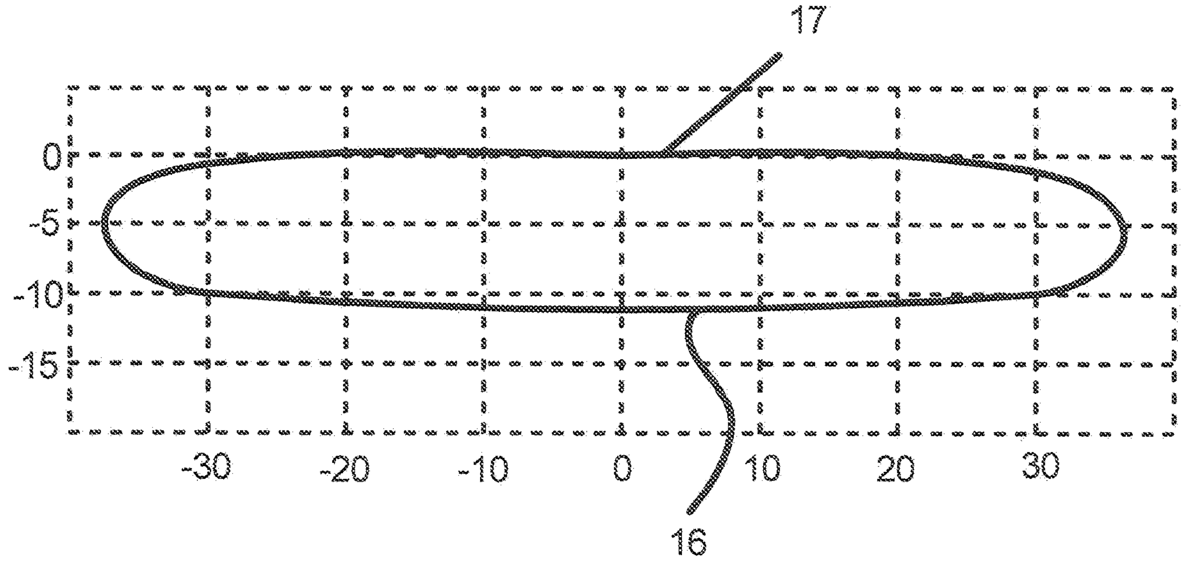
FIG. 5 shows a schematic representation of a light distribution produced by the headlight according to the invention.

As can be seen from FIGS. 2 and 3, the side margins 12 of the cone-shaped optical elements 9, 9', 9'' diverge in a fan-like manner from the narrow end 10 to the wide end 11 of the cone-shaped optical element 9, 9', 9''.

The opposite side margins 12 of the respective cone-shaped optical elements 9, 9', 9'' are connected to each other by an arc 14 (arc line). In the present embodiment, the arc 14 is designed as a circular arc. In the region of the narrow end 10 of the cone-shaped optical element 9, the circular arc has a radius r1 that lies in a range between 0.1 mm and 1 mm. In the direction of the wide end 11 of the cone-shaped optical element 9, the radius of the circular arc 14 increases continuously, wherein a radius r2 at the wide end 11 of the cone-shaped optical element 9 lies in the range between 1 mm and 10 mm. Overall, the radius of the arc 14 can be between 0.1 mm and 10 mm.

As can be seen from FIG. 3, the rows R of cone-shaped optical elements 9 are not offset from each other in the row direction 15. Rather, the rows R of cone-shaped optical elements 9 are arranged in a regular manner, wherein a first row R1 is followed by a similar second row R2 offset by a transverse extension of the row R to the first row R1. The narrow end 10 of the cone-shaped optical element 9 of the first row R1 is thus joined by a wide end 11 of the cone-shaped optical element 9 of the adjacent second row R2, and the wide end 11 of the cone-shaped optical element 9 of the first row R1 is joined by the narrow end of the cone-shaped optical element 9 of the adjacent second row R2.

The cone-shaped optical elements 9 of the rows R are preferably of the same design. Thus, the rows R of cone-shaped optical elements 9 have the same width. In the present embodiment, the rows R of cone-shaped optical elements 9 run in a horizontal direction, i.e., transversely to the optical axis A of the lens 4 and transversely to an arrangement direction 13 of the plurality of lenses 4.

The light sources 1 are preferably designed as LED light sources.

In the present embodiment, the scattering optic part 3 runs in the plane S. Alternatively, the scattering optic part 3 can also be slightly arc-shaped.

In the present embodiment, the scattering optic part 3 runs at a distance from the lens 4. The surface structuring 8 is located on a side of the scattering optic part 3 facing the lens 4.

Figure 6:
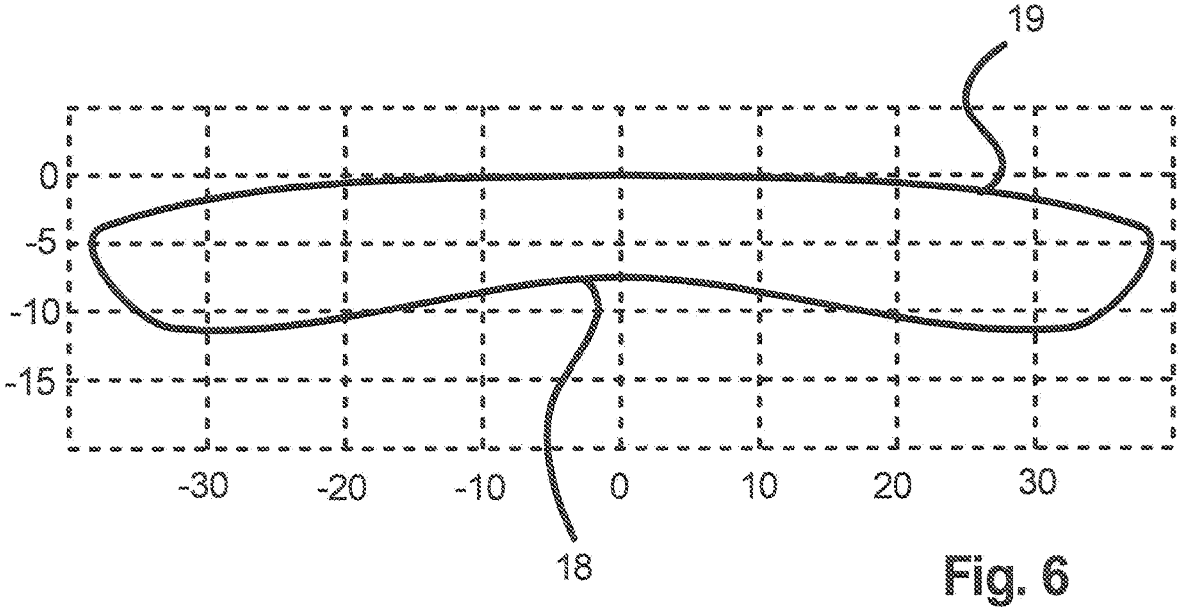
FIG. 6 shows a schematic representation of a light distribution produced via a headlight with a scattering optic part containing cylindrical optical elements.

Due to the inventive design of the surface structuring 8 as cone-shaped optical elements 9, a light distribution 16 can be generated which has a desired straight light/dark boundary 17. If the cone-shaped optical elements 9 were designed as cylindrical optical elements, a light distribution 18 according to FIG. 6 would be generated, whose light/dark boundary 19 slopes towards the opposite sides. The light/dark boundary 19 would thus be arc-shaped, which is not permitted by law.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A headlight for a vehicle, the headlight comprising:

a light source;

a lens arrangement associated with the light source, the lens arrangement comprising a light entry surface on a side facing the light source and a light emission surface on a side facing away from the light source, light emitted by the light source is mapped via the lens arrangement to a predetermined light distribution;

a scattering optic part being assigned to the lens arrangement to scatter the light emitted by the lens arrangement; and a surface structuring of the scattering optic part comprising a plurality of cone-shaped optical elements arranged in a row and which are arranged alternately in a curved manner in a row direction, the cone-shaped optical elements being formed by a first cone-shaped optical element and a second cone-shaped optical element, the second cone-shaped optical element being adjacent to the first cone- shaped optical element, and the second cone-shaped optical element being formed by twisting the first cone-shaped optical element on two substantially perpendicular axes, wherein the lens arrangement has a lens, the lens having the light entry surface, and wherein the light entry surface is an outwardly curved light entry surface, and wherein the lens has the light emission surface, the light emission surface being an aspherically formed light emission surface.

2. The headlight according to claim 1, wherein the cone-shaped optical elements diverge in a fan-like manner from a narrow end to a wide end with opposite side margins, and wherein the opposite side margins are connected to each other by an arc, a radius of which increases from the narrow end towards the wide end.

3. The headlight according to claim 2, wherein the arc of the cone-shaped optical elements is formed as a circular arc.

4. The headlight according to claim 3, wherein the circular arcs of the cone-shaped optical elements have a radius in a range between 0.1 mm and 10 mm.

5. The headlight according to claim 2, wherein the opposite side margins of the respective cone-shaped optical elements all extend in a common plane and/or each of the cone-shaped optical elements in the row of the cone-shaped optical elements extend in a common plane.

6. The headlight according to claim 2, wherein a plurality of rows of the cone-shaped optical elements is provided, wherein the rows of the cone-shaped optical elements are arranged such that the narrow end of the cone-shaped optical element of a first row is joined by the wide end of the cone-shaped optical element of an adjacent second row and such that the wide end of the cone-shaped optical element of the first row is joined by the narrow end of the cone-shaped optical element of the adjacent second row.

7. The headlight according to claim 1, wherein each of the cone-shaped optical elements have a same shape as one another.

8. The headlight according to claim 1, wherein the cone-shaped optical elements arranged adjacent in the row direction form a common side margin.

9. The headlight according to claim 1, wherein the scattering optic part runs in an extension plane.

10. The headlight according to claim 9, wherein the extension plane of the scattering optic part is arranged at an acute angle to an optical axis of the lens arrangement.

11. The headlight according to claim 1, wherein the scattering optic part is arranged at a distance in front of the lens arrangement.

12. The headlight according to claim 1, wherein the light source is an LED light source whose emitted light directly hits the light entry surface of the lens arrangement.

13. The headlight according to claim 1, wherein the row direction of the cone-shaped optical elements extends in a horizontal direction.

* * * * *